United States Patent
Gu et al.

(10) Patent No.: US 10,201,898 B2
(45) Date of Patent: Feb. 12, 2019

(54) SYSTEM FOR DISPATCHING CLEANING ROBOTS AND METHOD THEREOF

(71) Applicant: BOE TECHNOLOGY GROUP CO., LTD., Beijing (CN)

(72) Inventors: Yu Gu, Beijing (CN); Kai Zhao, Beijing (CN); Ying Zhang, Beijing (CN); Yifei Zhang, Beijing (CN); Hongli Ding, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 15/564,912

(22) PCT Filed: Apr. 13, 2017

(86) PCT No.: PCT/CN2017/080345
§ 371 (c)(1),
(2) Date: Oct. 6, 2017

(87) PCT Pub. No.: WO2017/185993
PCT Pub. Date: Nov. 2, 2017

(65) Prior Publication Data
US 2018/0194006 A1 Jul. 12, 2018

(30) Foreign Application Priority Data
Apr. 28, 2016 (CN) .......................... 2016 1 0278472

(51) Int. Cl.
*B25J 9/16* (2006.01)
*G05D 1/02* (2006.01)
(Continued)

(52) U.S. Cl.
CPC .......... *B25J 9/1682* (2013.01); *A47L 9/2826* (2013.01); *B25J 9/162* (2013.01); *B25J 9/1664* (2013.01);
(Continued)

(58) Field of Classification Search
CPC .... A47L 9/2805; A47L 9/2826; A47L 9/2894; A47L 11/24; A47L 11/4011;
(Continued)

(56) References Cited

U.S. PATENT DOCUMENTS

2013/0101159 A1  4/2013  Chao et al.
2014/0079282 A1*  3/2014  Marcheselli ....... G06K 9/00335
                                                          382/103
(Continued)

FOREIGN PATENT DOCUMENTS

CN   101953172 A       1/2011
CN   103064743 A  *   4/2013  ............. G06Q 10/06
(Continued)

OTHER PUBLICATIONS

First Office Action in the Chinese Patent Application No. 201610278472.2, dated Feb. 7, 2018; English translation attached.
(Continued)

*Primary Examiner* — Dale Moyer
(74) *Attorney, Agent, or Firm* — Intellectual Valley Law, P.C.

(57) ABSTRACT

The present application discloses a system for dispatching cleaning robots. The system includes an input subsystem configured to provide an input signal including information about foot traffic in a time period in an area. The system includes a processing subsystem to receive and process the input signal and further to determine a cleaning task under an operation scheme and generate a control signal for the cleaning task. Further the system includes a communication subsystem configured to receive the control signal from the processing subsystem and one or more first signals respectively from the one or more cleaning robots. The communication subsystem sends the control signal based on the one or more first signals to dispatch at least one cleaning robot
(Continued)

to the area to perform the cleaning task and receives one second signal from the cleaning robot to update the operation scheme.

20 Claims, 6 Drawing Sheets

(51) Int. Cl.
*G05B 15/02* (2006.01)
*A47L 9/28* (2006.01)
*B25J 11/00* (2006.01)

(52) U.S. Cl.
CPC .......... *B25J 9/1669* (2013.01); *B25J 9/1697* (2013.01); *B25J 11/0085* (2013.01); *G05B 15/02* (2013.01); *G05D 1/0297* (2013.01); A47L 2201/06 (2013.01); G05B 2219/2642 (2013.01); G05B 2219/31277 (2013.01); G05B 2219/45078 (2013.01); G05B 2219/45098 (2013.01); G05D 2201/0203 (2013.01); Y02P 90/02 (2015.11); Y10S 901/01 (2013.01); Y10S 901/47 (2013.01)

(58) Field of Classification Search
CPC .......... A47L 2201/00; A47L 2201/04; A47L 2201/06; B25J 11/0085; G05B 2219/45098; G05D 1/0011; G05D 1/0246; G05D 1/0276; G05D 2201/0203; G05D 2201/0215; G06K 9/00335; G06K 9/00771; G06K 9/00778; G06T 7/20; G06T 2207/30196; G06T 2207/30232; G06T 2207/30241; Y10S 901/01
See application file for complete search history.

(56) References Cited

U.S. PATENT DOCUMENTS

| | | | | |
|---|---|---|---|---|
| 2014/0278252 | A1* | 9/2014 | Wold | ................... G01N 27/048 |
| | | | | 702/189 |
| 2016/0167233 | A1* | 6/2016 | Zhang | ...................... B25J 9/163 |
| | | | | 382/153 |
| 2017/0265703 | A1* | 9/2017 | Park | .......................... A47L 9/28 |
| 2018/0092499 | A1* | 4/2018 | Strazisar | ............... G05D 1/0022 |

FOREIGN PATENT DOCUMENTS

| | | | |
|---|---|---|---|
| CN | 103268111 | A | 8/2013 |
| CN | 103399543 | A * | 11/2013 |
| CN | 104771118 | A | 7/2015 |
| CN | 104932495 | A | 9/2015 |
| CN | 105380575 | A | 3/2016 |
| CN | 105425791 | A | 3/2016 |
| CN | 105892321 | A | 8/2016 |
| JP | H0557669 | A | 3/1993 |
| WO | 2009102970 | A2 | 8/2009 |
| WO | 2016027957 | A1 | 2/2016 |

OTHER PUBLICATIONS

International Search Report & Written Opinion dated Jul. 24, 2017, regarding PCT/CN2017/080345.

* cited by examiner

SYSTEM FOR DISPATCHING CLEANING ROBOTS AND METHOD THEREOF

CROSS-REFERENCE TO RELATED APPLICATION

This application is a national stage application under 35 U.S.C. § 371 of International Application No. PCT/CN2017/080345, filed Apr. 13, 2017, which claims priority to Chinese Patent Application No. 201610278472.2, filed Apr. 28, 2016, the contents of which are incorporated by reference in the entirety.

TECHNICAL FIELD

The present invention relates to robot technologies, particularly, a system for dispatching one or more cleaning robots and a method thereof.

BACKGROUND

In recent years, autonomous robots have found a wide range of applications in people's life. Various kinds of cleaning robots, such as sweeping robot, moping robot, and window-cleaning robot, have gradually been used for accomplishing various types of relatively simple cleaning duties in domestic household environment. For large public places, a large-scale commercial cleaning robot can be used for cleaning. Most commercial cleaning robots are differentiated from the household cleaning robot in terms of a greater autonomy function, a much longer battery life, and a larger volume and capacity.

SUMMARY

In one aspect, the present invention provides a system for dispatching cleaning robots, comprising an input subsystem configured to provide an input signal including information about foot traffic in a time period in an area; a processing subsystem comprising a processing block and a control block, the processing block configured to receive the input signal and process the input signal, the control block coupled to the processing block to determine a cleaning task under an operation scheme and generate a control signal for the cleaning task; and a communication subsystem configured to receive the control signal from the processing subsystem and one or more first signals respectively from the one or more cleaning robots indicating operating status of the one or more cleaning robots, configured to send the control signal based on the one or more first signals to dispatch at least one cleaning robot to the area to perform the cleaning task, and configured to receive at least one second signal from the at least one cleaning robot for the processing block to update the operation scheme; the at least one second signal indicating a progress of the cleaning task being performed.

Optionally, the input subsystem comprises a plurality of monitoring devices including surveillance cameras and traffic counters being disposed in multiple areas.

Optionally, the input signal comprises a plurality of images collected by one or more surveillance cameras in the area over the time period counted from a time when a cleaning task is finished in the area by one cleaning robot.

Optionally, the processing block is configured to process the plurality of images to obtain a cumulated foot-traffic volume in the time period for the area.

Optionally, the processing subsystem further comprises a memory coupled to the processing block, the memory configured to store the input signal and multiple parameters used to define the operation scheme, the multiple parameters including a first foot-traffic threshold, a second foot-traffic threshold, multiple volume ranges between the first foot-traffic threshold and the second foot-traffic threshold, a first duration threshold, a second duration threshold, multiple time ranges between the first duration threshold and the second duration threshold, multiple values of probability-for-cleaning assigned respectively to the multiple volume ranges and multiple time ranges, a probability threshold for initiating a cleaning task, and a dirtiness threshold level preset for a standard cleaning task.

Optionally, the operation scheme comprises computer-executable instructions to be executed by the control block for determining that the cleaning task is needed based on a determination that the cumulated foot-traffic volume is greater than or equal to the second foot-traffic threshold and the time period is greater than or equal to the second duration threshold.

Optionally, the operation scheme further comprises computer-executable instructions to be executed by the control block for determining the cleaning task base on a determination that the cumulated foot-traffic volume is smaller than the second foot-traffic threshold but greater than the first foot-traffic threshold and the time period is shorter than the second duration threshold but longer than the first duration threshold, that the cumulated foot-traffic volume is in one of the multiple volume ranges and the time period is in one of multiple time ranges, and that the probability-for-cleaning corresponding to the one of the multiple volume ranges and the one of the multiple time ranges is greater than or equal to the probability threshold.

Optionally, the operation scheme comprises computer-executable instructions for selecting one or more cleaning robots, dividing the area associated with the cleaning task optionally into two or more regions, and formatting one or more control signals respectively to be sent to the selected one or more cleaning robots for performing the cleaning task in the area and optionally to two or more cleaning robots respectively for cleaning in the two or more regions.

Optionally, the operation scheme further comprises computer-executable instructions to be executed by the control block for selecting one cleaning robot capable of moving to a field position in a shortest time for performing the cleaning task as a selected cleaning robot out of the one or more cleaning robots determined to be at idle modes having full strength of battery power based on the one or more first signals.

Optionally, the operation scheme further comprises computer-executable instructions to be executed by the control block for selecting one cleaning robot with a most available battery power sufficient for capable of finishing a previous cleaning task and moving to the field position to perform the cleaning task in a shortest time as a selected cleaning robot out of the one or more cleaning robots determined to be at cleaning modes based on the one or more first signals.

Optionally, the operation scheme further comprises computer-executable instructions to be executed by the control block for dividing an cleaning area associated with the cleaning task into two or more sub-areas associated with two or more second cleaning tasks based on the at least one second signal after selecting two or more cleaning robots capable of performing the cleaning task out of the one or more cleaning robots at idle modes based on the one or more first signals, and sending two or more second control signals via the communication subsystem respectively to the two or more cleaning robots to move them respectively to the two or more sub-areas to respectively perform the two or more second cleaning tasks.

Optionally, the operation scheme comprises a sampling algorithm including a sixth plurality of computer-executable instructions to be executed by a selected cleaning robot that is performing the cleaning task to operate an inspection device to measure garbage area or quantity associated with the cleaning task to determine a dirtiness level to be sent as one of the second signal back to the control block via the communication subsystem and further executed by the processing block for comparing the dirtiness level with the dirtiness threshold level.

Optionally, the operation scheme comprises an update algorithm including a seventh plurality of computer-executable instructions to be executed by the control block for updating the value of the probability-for-cleaning corresponding to the cumulated foot-traffic volume in one of the multiple volume ranges and the time period within one of the multiple time ranges by increasing a first preset amount if the dirtiness level is determined to be greater than the dirtiness threshold level, or by decreasing a second preset amount if the dirtiness level is determined to be smaller than the dirtiness threshold level, the first preset amount and the second preset amount being obtained empirically.

Optionally, the communication subsystem comprises a transceiver capable of transmitting control signals to and receiving feedback signals from the one or more cleaning robots via a wireless network and capable of exchanging the control signals and the feedback signals with the control block.

In another aspect, the present invention provides a method for operating a system for dispatching one or more cleaning robots to perform a cleaning task, the system comprising an input subsystem, a processing subsystem coupled to the input subsystem, a communication subsystem coupled to the processing subsystem, the method comprising collecting information about foot traffic in a time period for an area by the input subsystem; processing the information by the processing subsystem to obtain a foot traffic volume cumulated in the time period; determining a cleaning task in the area based on a result of the foot traffic volume cumulated in the time period by the processing subsystem under an operation scheme defined by multiple parameters to generate a control signal for the cleaning task; receiving one or more first signals indicating operating status of the one or more cleaning robots respectively from one or more cleaning robots by the communication subsystem; determining at least one of the one or more cleaning robots to be mostly suitable for the cleaning task by the processing subsystem based on the one or more first signals; sending the control signal to dispatch the at least one cleaning robot to the area to perform the cleaning task; and receiving at least one second signal for adjusting at least one of the multiple parameters to update the operation scheme, the at least one second signal indicating a progress of the cleaning task being performed.

Optionally, collecting information about foot traffic comprises taking a plurality of images in the time period of multiple time windows with at least one image per time window by at least one public surveillance camera in the area.

Optionally, processing the information comprises processing the plurality of images by counting people in the at least one image per time window to deduce a foot-traffic volume thereof and obtain a cumulated foot-traffic volume in entire duration of the time period.

Optionally, determining the cleaning task comprises determining the cumulated foot-traffic volume to be greater than or equal to a first foot-traffic threshold and determining the time period to be longer than or equal to a first duration threshold, the first foot-traffic threshold and the first duration threshold being two parameters of the multiple parameters for defining a part of the operation scheme.

Optionally, determining the cleaning task further comprises determining a cleaning probability by the processing subsystem to be greater than or equal to a probability threshold after determining the cumulated foot-traffic volume to be greater than the first foot-traffic threshold but smaller than a second foot-traffic threshold and the time period to be longer than the first duration threshold but shorter than a second duration threshold, the second foot-traffic threshold and the second duration threshold and the probability threshold being three parameters for defining another part of the operation scheme.

Optionally, determining the cleaning probability by the processing subsystem further comprises defining multiple time ranges between the first duration threshold and the second duration threshold, defining multiple volume ranges between the first foot-traffic threshold and the second foot-traffic threshold, assigning multiple values of the cleaning probability increasing from 0 to 1 respectively corresponding to the multiple volume ranges increasing from the first foot-traffic threshold to the second foot-traffic threshold for each of the multiple time ranges, and determining a current value of the cleaning probability—by determining the cumulated foot-traffic volume to be in a corresponding one of the multiple volume ranges with the time period to be in a corresponding one of the multiple time ranges, comparing the current value with the probability threshold, the multiple values of the cleaning probability being parameters for defining yet another part of the operation scheme.

Optionally, the cleaning probability equals to 1 if the cumulated foot-traffic volume is determined to be greater than the second foot-traffic threshold and the time period is determined to be longer than a second duration threshold.

Optionally, receiving the one or more first signals respectively from the one or more cleaning robots is performed using a transceiver via a wireless communication network, each first signal comprising information about a current operation mode and available battery power of a corresponding cleaning robot and traveling time required to move the corresponding cleaning robot from its current position to a field position in the area associated with the cleaning task.

Optionally, determining at least one of the one or more cleaning robots to be mostly suitable to the cleaning task comprises determining the current operation mode of one or more cleaning robots to be at an idle mode and selecting one cleaning robot out of the one or more cleaning robots with a shortest traveling time required to move to the field position for the cleaning task.

Optionally, determining at least one of the one or more cleaning robots to be mostly suitable to the cleaning task comprises determining the current operation mode of one or more cleaning robots to be in a cleaning mode respectively performing alternative one or more cleaning tasks, determining the available battery power of each of the one or more cleaning robots to be greater than that required for performing the cleaning task, and selecting one cleaning robot out of the one or more cleaning robots with a shortest time required to finish the alternative cleaning task and move to the field position for the cleaning task.

Optionally, the method further comprises transmitting the control signal through the transceiver to drive the selected one cleaning robot to move towards a field position for performing the cleaning task.

Optionally, performing the cleaning task by the selected one cleaning robot comprises determining a dirtiness level of a garbage area by an inspection unit of the cleaning robot and executing a cleaning function in the garbage area by a cleaning unit of the cleaning robot.

Optionally, determining the dirtiness level comprises calculating a ratio of the garbage area divided by total area of the area by the cleaning robot before executing the cleaning function.

Optionally, determining the dirtiness level comprises obtaining a garbage quantity after executing the cleaning function.

Optionally, the second signal includes a signal indicating the dirtiness level; the method further comprising determining the dirtiness level to be greater than a preset dirtiness threshold level by the processing subsystem; and updating the value of the cleaning probability corresponding to the cumulated foot-traffic volume in one of the multiple volume ranges and the time period within one of the multiple time ranges by increasing a first preset amount, the first preset amount being obtained empirically.

Optionally, the second signal includes a signal indicating the dirtiness level; the method further comprising determining the dirtiness level to be smaller than a preset dirtiness threshold level; and updating the value of the probability-for-cleaning corresponding to the cumulated foot-traffic volume in one of the multiple volume ranges and the time period within one of the multiple time ranges by decreasing a second pre-set amount, the second preset amount being obtained empirically.

Optionally, the method further comprises, based on the at least one second signal, selecting one cleaning robot under the operation scheme to perform the cleaning task sequentially in each of two or more regions of the area or selecting one cleaning robot under the operation scheme to simultaneously perform a separate cleaning task in each of the two or more regions.

BRIEF DESCRIPTION OF THE FIGURES

The following drawings are merely examples for illustrative purposes according to various disclosed embodiments and are not intended to limit the scope of the present disclosure.

DETAILED DESCRIPTION

Figure 1:
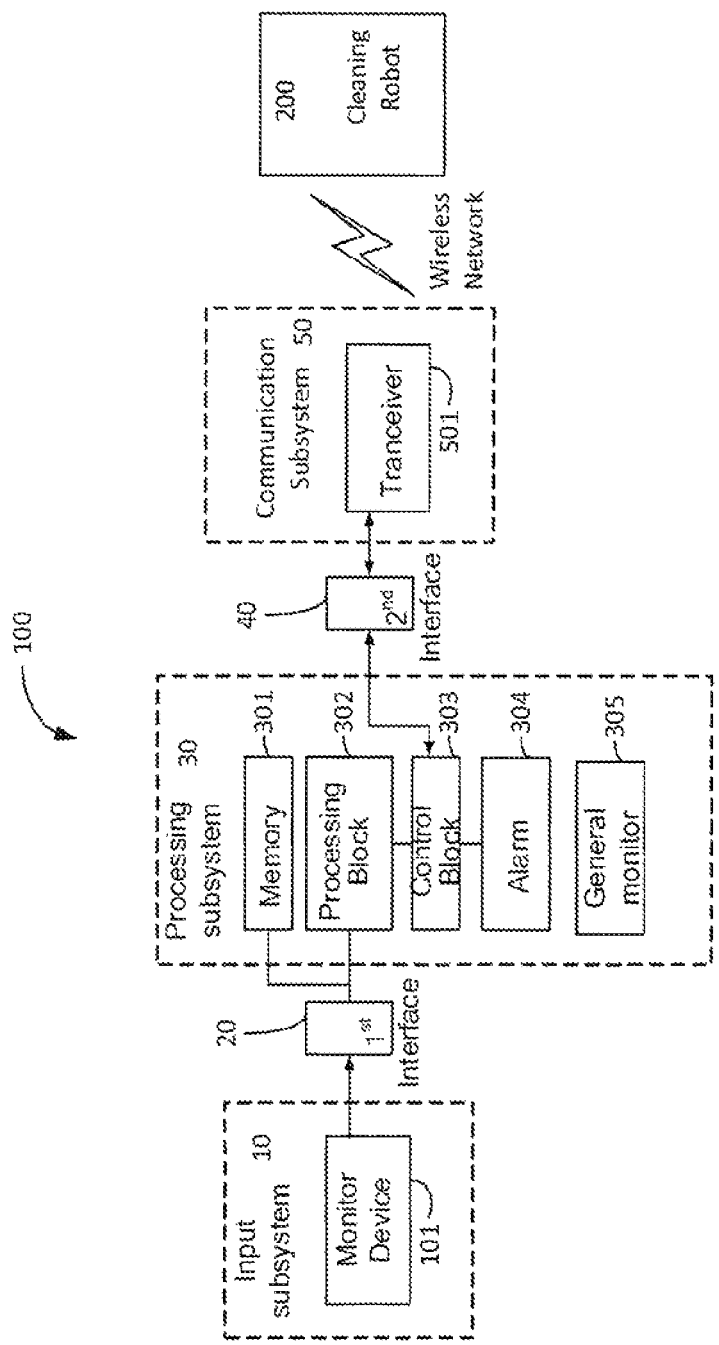
FIG. 1 is a block diagram of a system for dispatching a cleaning robot under an operation scheme according to some embodiments of the present disclosure.

The disclosure will now be described more specifically with reference to the following embodiments. It is to be noted that the following descriptions of some embodiments are presented herein for purpose of illustration and description only. It is not intended to be exhaustive or to be limited to the precise form disclosed.

Large-scale public places such as shopping malls, stadiums, and hospitals are involved with dynamic environment conditions associated with a large foot-traffic volume and a large cleaning area. It is extremely demanding to maintain cleanliness of these public places. The cleaning task for maintaining these public places thus requires a cleaning robot having a long-lasting battery power to continuously clean the area, imposing a heavy on the battery power of the cleaning robot. To avoiding wasting battery power of the cleaning robot, it is required to have human inspectors to check on the cleanliness of various areas of the public place, and decide whether or not to dispatch a cleaning robot to clean a dirty area. The process is cumbersome and costly.

Accordingly, the present disclosure provides, inter alia, a system for determining an area (e.g., a public place) that needs a cleaning task and selecting at least one cleaning robot suitable for performing the clean task, and a method for operating the system for dispatching at least one cleaning robot under an operation scheme that substantially obviate one or more of the problems due to limitations and disadvantages of the related art. In one aspect, the present disclosure provides a system for dispatching cleaning robots. In some embodiments, the system includes an input subsystem configured to provide an input signal including information about foot traffic in a time period in the area (e.g., a public place); a first interface coupled to the input subsystem and configured to transmit the input signal; a processing subsystem having a processing block and a control block, the processing block being coupled to the first interface to receive the input signal and process the input signal, the control block coupled to the processing block to determine a cleaning task under an operation scheme and generate a control signal for the cleaning task; a second interface coupled to the processing subsystem and configured to transmit signals via a bi-direction bus; and a communication subsystem coupled to the second interface, configured to receive the control signal from the processing subsystem and one or more first signals respectively from the one or more cleaning robots indicating operating status of the one or more cleaning robots, configured to send the control signal based on the one or more first signals to dispatch at least one cleaning robot to the area to perform the cleaning task, and configured to receive at least one second signal from the at least one cleaning robot for the processing block to update the operation scheme, the at least one second signal indicating a progress of the cleaning task being performed.

FIG. 1 is a block diagram of a system for dispatching a cleaning robot under an operation scheme according to some embodiments of the present disclosure. Referring to FIG. 1, a system 100 for dispatching a cleaning robot for performing cleaning task in an area is provided. The system 100 includes an input subsystem 10 for receiving an input signal related to dirtiness level of an area (e.g., a public place), a processing subsystem 30 configured to process the input signal for determining if a cleaning task is necessary for the area and generating a control signal under an operation scheme if the cleaning task is initiated, and a communication subsystem 50 configured to conduct signal communication between the processing subsystem 30 and multiple cleaning robots 200 disposed for multiple areas. In addition, a first interface 20 is provided in the system 100 for delivering the input signal via a uni-directional bus from the input subsystem 10 to the processing subsystem 30. A second interface 40 is provided in the system 100 for transmitting or receiving signals via a bi-directional bus between the processing subsystem 30 and the communication subsystem 50. The signal communication between the communication subsystem 50 and multiple cleaning robots 200 is realized via a wireless network in WiFi protocol or other compatible format to transfer the control signal to one or more cleaning robots to dispatch at least one cleaning robot 200 for performing the cleaning task and to transfer one or more feedback signals reversely to the processing subsystem 30 for updating the operation scheme as a self-learning process.

In some embodiments, the input subsystem 10 includes a plurality of monitoring devices 101 for collecting the input signal. For maintaining cleanliness in an area (e.g., a public place), the input signal related to the dirtiness level is highly correlated to foot-traffic volume over time. The monitor device 101 can be a surveillance camera or a counter device. The surveillance camera is able to provide images showing real time field information about foot-traffic volume and even direct recording garbage disposing events in the area. The counter device is at least able to provide real-time measurement of people passing certain area in the area. These monitor devices are readily set up for general purposes and can be directly utilized by the input subsystem 10 of the system 100 for intelligently dispatching a cleaning robot for maintaining cleanliness. In particular, the system 100 is configured to couple a plurality of such monitor devices 101 disposed in multiple area into its input subsystem 10 and collect an input signal about foot-traffic from each of the multiple area and use the input signal to make intelligent decision under the operation scheme on dispatching a cleaning robot only to an area that is determined to be necessary for cleaning.

Referring to FIG. 1, the processing subsystem 30 in some embodiments is coupled to the input subsystem 10 via the first interface 20 which is configured to transfer the input signal from a plurality of monitor devices 101 disposed in an area or multiple input signals at the same time from different groups of monitor devices disposed respectively in multiple areas. In an embodiment, the input signal is transferred as a digital format through the first interface 20. In an embodiment, the first interface 20 is configured to transfer date in a unidirectional bus. The processing subsystem 30 includes a memory 301 configured to receive the input signal as digital data and store the data which are usually the plurality of images taken over the multiple areas by the plurality monitor devices 101. The processing subsystem 30 includes a processing block 302 coupled to the memory 301 as well as the first interface 20 and configured to process the input signal. Particularly, the processing block 302 includes one more image processors for processing the plurality of images. Optionally, the processing block 302 is a head counter of people from the image data or counter data. In general, a cumulated foot-traffic volume of a particular area over a certain time period can be obtained by the processing block 302. The time period can be set to be an entire duration starting from a time when a last cleaning task was done on record in the particular area to a current time. The cumulated foot-traffic volume is a parameter highly correlated with dirtiness level in the area and is employed in the operation scheme for determining if a cleaning task is necessary for the particular area. Optionally, the processing block 302 is an image analyzer capable of further identifying and characterizing garbage information to assist the determination on whether to initiate a cleaning task.

Referring to FIG. 1, the processing subsystem 30 includes a control block 303 coupled to the processing block 302 for determining a cleaning task based on the processed input signal under the operation scheme. In some embodiment, the control block 303 is configured to perform multiple logic calculations using the processed input signal from the processing block 302 as an input and based on a predetermined operation scheme for intelligently determining a cleaning task for an area (e.g., a public place) and generating a control signal as output for dispatching one or more cleaning robots to perform the cleaning task. Optionally, the processed input signal is the cumulated foot-traffic volume in a time period for the area, which is considered to be highly correlated to dirtiness level of the area.

In some embodiments, the operation scheme is defined by multiple parameters including at least a first foot-traffic threshold, a second foot-traffic threshold which is higher than the first foot-traffic threshold, a first duration threshold, a second duration threshold which is longer than the first duration threshold. Both the first foot-traffic threshold and the first duration threshold set a minimum value for possibly initiating a cleaning task. In other word, if the foot-traffic volume of an area (e.g., a public place) is smaller than the first foot-traffic threshold or the time period for collecting foot-traffic information is shorter than the first duration threshold, the probability for initiating a cleaning task is 0. Both the second foot-traffic threshold and the second duration threshold set a value that a cleaning task is a must, or the probability for initiating a cleaning task is 1 if the foot-traffic volume of the area is larger than the second foot-traffic threshold or the time period for collecting the foot-traffic information is longer than the second duration threshold. Other parameters for defining the operation scheme includes multiple (M) volume ranges between the first foot-traffic threshold and the second foot-traffic threshold, multiple (N) time ranges between the first duration threshold and the second duration threshold, and multiple values $P_{MN}$ of probability-for-cleaning assigned respectively to the multiple volume ranges and multiple time ranges in M×N optional correspondence relationships. For example, a value $P_{34}$ of probability-for-cleaning is assigned to for every cumulated foot-traffic volume in $3^{rd}$ volume range and every time period for collecting the cumulated foot-traffic volume in $4^{th}$ time range. Additional parameters for defining the operation scheme include a probability threshold for initiating a cleaning task and a dirtiness threshold level preset for a standard cleaning task. Optionally, these parameters are obtained empirically and stored in the memory 301. Optionally these parameters can be varied for different areas (e.g., different public places) or updated for different seasons over a year. In particular, some parameters can be updated internally by the system 100 through a self-learning process based on feedback signals received by the control block 303 sent from one or more cleaning robots that is performing the cleaning task.

Referring back to FIG. 1, the control block 303 is able to performing a logic calculation to compare the cumulated foot-traffic volume in the time period from a last cleaning task to current time in an area (e.g., a public place) with the currently stored parameters for the operation scheme. If the cumulated foot-traffic volume is smaller than the first foot-traffic threshold and the time period is shorter than the first duration threshold, then the control block determines that no cleaning task is necessary for this area. If the cumulated foot-traffic volume is greater than the second foot-traffic threshold and the time period is longer than the second duration threshold, the control block 303 determines there must be a cleaning task for the area. If the cumulated foot-traffic volume is greater than the first foot-traffic threshold but smaller than the second foot-traffic threshold, it is further identified the particular volume range in which the cumulated foot-traffic volume falls. If the time period is longer than the first duration threshold but shorter than the second duration threshold, it is further identified the particular time range in which the time period falls. Then, the control block 303 can determine that the value of probability-for-cleaning assigned for the particular volume range and time range is a current probability-for-cleaning for the area. The control block 303 further performs a logic calculation to compare the current probability-for-cleaning with the probability threshold under the operation scheme. If the current probability-for-cleaning is equal to or greater than the probability threshold, the control block 303 determines a cleaning task for the area. Otherwise, no cleaning task is needed for the area.

The determination logic used above under the operation scheme is to discrete the cumulated foot-traffic volume and the time period so that the decision can be optimized. For example, assuming that the first foot-traffic threshold is 100 people and the second foot-traffic threshold is 600 people, in between, five volume ranges are preset: 100-200, 200-300, 300-400, 400-500, and 500-600). Assuming that the first duration threshold is 6 hours and the second duration threshold is 24 hours, in between, three time ranges are preset: 6-12, 12-18, and 18-24. For each preset volume range, three values of probability-for-cleaning are assigned corresponding to three preset time ranges, respectively. For example, for a volume range of 100-200 people, the time range of 6-12 corresponds a first value of probability-for-cleaning, the time range of 12-18 corresponds to a second value of probability-for-cleaning, and the time range of 18-24 corresponds to a third value of probability-for-cleaning. Totally, there are 5×3=15 correspondence relationships between a value of probability-for-cleaning and a particular range of certain foot-traffic volume and time period. The initially assigned values of probability-for-cleaning for all ranges are obtained empirically and stored in the memory. Later, every time when a cleaning task is finished, an opportunity is provided to update these values based on latest information about actual dirtiness level of the area in the current situation. Therefore, the determination logic of the control block 303, after receiving the cumulated foot-traffic volume collected in a time period from the processing block 302, will firstly identify which volume range is of the cumulated foot-traffic volume and which time range is of the time period for collecting above foot-traffic volume. Then, a probability-for-cleaning corresponding to this cumulated foot-traffic volume and time period can be determined based the predetermined correspondence relationship mentioned above.

Referring to FIG. 1, the processing subsystem 30 also includes an alarm unit 304 and a general monitor 305. The general monitor 305 is for monitoring circuitry operation and detecting any irregularity in input signal reception, signal processing, feedback signal reception, and control signal generation by the processing subsystem 30. The alarm unit 304 is configured to make alarm signals or send alarm messages based on different kinds of abnormity requiring human intervening.

Referring to FIG. 1 again, the communication subsystem 50 of the system 100 further includes a transceiver 501 configured to convert the control signal transferred from the control block 303 via the second interface 40 into a format that is compatible to a wireless network for sending it to any selected cleaning robots 200 in the field. Alternatively, the transceiver 501 is also configured to receive one or more feedback signals from any cleaning robot 200 in the field via the same wireless network. WiFi network or Bluetooth network is one of the options for this local area communication.

Figure 2:
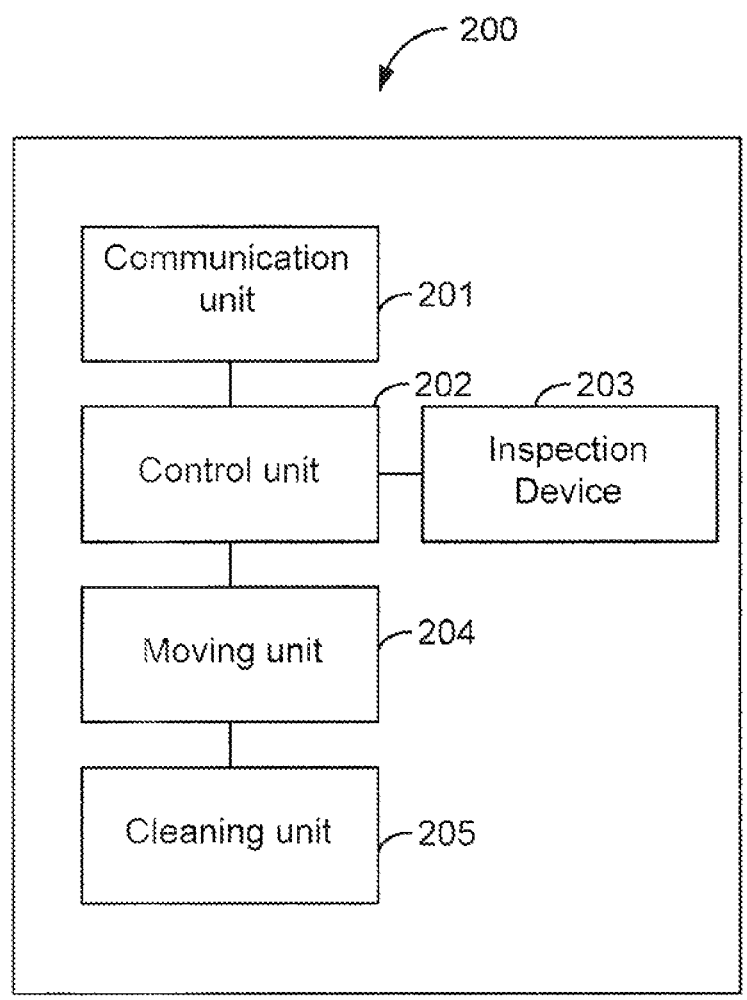
FIG. 2 is a block diagram of a cleaning robot subjected to dispatch for performing a cleaning task under an operation scheme according to some embodiments of the present disclosure.

FIG. 2 is a block diagram of a cleaning robot subjected to dispatch for performing a cleaning task under an operation scheme according to some embodiments of the present disclosure. Referring to FIG. 2, each cleaning robot is designed to be compatible with the system 100 for an intelligent dispatching operation. The cleaning robot 200 includes a communication unit 201 configured to receive control signal from the system 100 (specifically from the communication subsystem 50) and also configured to send any feedback signal related to current status of the cleaning robot itself or any field information nearby related to the cleaning task. The cleaning robot 200 includes a control unit 202 for handling the control signal passed from the communication unit 201. Optionally, the control unit 202 is able to generate specific instruction, following the control signal, to a moving unit 204 to drive the cleaning robot to move to a target field position. Optionally, the control unit 202 is able to generate another specific instruction, following the control signal, to a cleaning unit 205 to conduct cleaning (vacuum cleaning, washing, mopping, etc.) operation. Optionally, the control unit 202 is able to generate another specific instruction to an inspection unit 203 for collect information about garbage area or garbage amount before, during, and after the cleaning task. And the control unit 202 is able to process the information collected by the inspection unit 203 and convert the information to a digital format to be sent as a signal by the communication unit 201. Optionally, the inspection unit 203 includes a camera for capturing images about the garbage area or other sensors designed for identify garbage material types or amount.

In some embodiments, the cleaning robot 200 is operated in following modes: 1) cleaning mode, i.e., it is currently performing a cleaning task previously assigned while it is open to receive any control signal for other cleaning tasks; 2) idle mode, i.e., it has been fully charged while no current cleaning task and open to receive any control signal for a new cleaning task; 3) moving mode, i.e., it is moving toward a target field location after receiving a control signal for a cleaning task, not yet in cleaning operation, and open to receive any control signal for other cleaning tasks; 4) charging mode, i.e., it is being charged and not open to receive any control signal until the charging is finished.

In some embodiments, the communication unit 201 of the cleaning robot 200 is configured to send a first signal back to the system 100 for indicating operating status of the one or more cleaning robots. e.g., the current mode of the cleaning robot, no matter what the current mode is one of about four modes. Additionally, the first signal contains information about the location and available battery power of this cleaning robot, time spent for current cleaning task if it is in cleaning mode and estimated time to finish the current task, and time needed for it to move from current location to a target location. The system 100 has the control block 303 in the processing subsystem 30 to analyze the first signal received from each cleaning robot separately under the operation scheme. The control block 303 is configured to calculate a time needed for each cleaning robot in idle mode to travel from its current location to the target location of an upcoming cleaning task, so that a cleaning robot bearing a shortest travel time can be selected out of multiple cleaning robots in idle mode. The control block 303 is configured to calculate total time needed for a cleaning robot in cleaning mode to finish its previously-assigned cleaning task, then to travel to the target location for the upcoming cleaning task and estimate the available battery power for above tasks and be able to return to charging stage after all, so that a cleaning robot bearing a shortest total time with sufficient battery power can be selected out of multiple cleaning robots in cleaning mode or moving mode.

In some embodiments, the first signal from a cleaning robot includes information indicating that the cleaning robot is in an abnormal state. For example, the cleaning robot has mechanical problem, battery power loss unexpectedly, unusual object preventing the cleaning, received control signal for cleaning but not responded to move or no signal being sent to report its moving mode, etc. The alarm unit 304 will produce alarm signal or generate alarm message for human intervening. In an alternative embodiment, the abnormal state of a cleaning robot may also be detected by the input subsystem 10 through a plurality of monitor devices 101 disposed in the corresponding area (e.g., a corresponding public place). For example, the monitor device 101 may be able to detect a cleaning robot in cleaning mode but being stationary for long time or a cleaning robot in moving mode after finishing a cleaning task but not able to return the charging station.

In some additional embodiments, the communication unit 201 of the cleaning robot 200 is configured to send a second signal back to the system 100 for indicating a progress of the cleaning task being performed, e.g., reporting how a current cleaning task is performed. Specifically, the second signal contains information of garbage area measured before cleaning and garbage amount collected after cleaning. The information comes from real-time assessment of each cleaning task, which in turn provides a learning basis for the system 100 to improve its dispatching management efficiency. As the information is received as the second signal by the control block 303 of the processing subsystem 30, optionally, the control block 303 is able to quantify a dirtiness level associated with the current cleaning task. For example, a dirtiness level can be characterized by taking a ratio of the garbage area over a total area of the area to be cleaned. Or in an alternative example, the dirtiness level is simply determined by the garbage amount. The control block 303 is able to perform a logic calculation to compare the new dirtiness level associated with a cleaning task with a pre-stored dirtiness threshold level under the current operation scheme. If the dirtiness level is greater than the dirtiness threshold level, the control block 303 is able to update the value of probability-for-cleaning previously assigned for the cumulated foot-traffic volume in the time period currently obtained for initiating the latest cleaning task by increasing the value by a first preset amount, i.e., increasing a likelihood for initiating a cleaning task for similar situation in the area next time. If the dirtiness level is less than the dirtiness threshold level, the control block 303 is able to update the value of probability-for-cleaning previously assigned for the cumulated foot-traffic volume in the time period currently obtained for initiating the latest cleaning task by decreasing the value by a second preset amount, i.e., reducing a likelihood for initiating a cleaning task for similar situation in the area next time. The first preset amount or the second preset amount is obtained empirically and can be different for different areas (e.g., different public places) and updated manually or automatically through a higher-level control. As used herein, the term "dirtiness threshold level" refers to a threshold level of dirtiness which may be characterized by various appropriate physical parameters. In one example, the dirtiness threshold level is a threshold ratio of the garbage area over a total area of the area to be cleaned. In another example, the dirtiness threshold level is a threshold garbage amount of the area to be cleaned.

Optionally, other parameters used to define the operation scheme can be updated through self-learning process based on the second signal containing the real-time dirtiness level obtained during performing the latest cleaning task. For example, the first foot-traffic threshold may be raised if more often the value of probability-for-cleaning is increased after latest cleaning operation or reduced if more often the value of probability-for-cleaning is reduced. Similarly, other threshold values may be updated for enhance overall efficiency in executing the operation scheme for intelligently dispatching cleaning robots for performing cleaning tasks in multiple areas.

In some embodiments, based on multiple first signals from multiple cleaning robots, the control block 303 is able to keep the latest status information for all the multiple cleaning robots. As multiple input signals respectively from multiple areas (e.g., multiple public places) are received, processed, and determined that multiple cleaning tasks are necessary in multiple areas, the control block 303 is able to select multiple available cleaning robots respectively and generate corresponding control signals respectively to dispatch multiple selected cleaning robots to the corresponding multiple areas for performing the cleaning tasks thereof.

In some embodiments, based on the second signal from the cleaning robot in the target field of the area, the control block 303 can perform an alternative logic operation to divide the pubic place into two or more regions so that two or more cleaning tasks are initiated respectively for cleaning the two or more regions. For example, it is necessary when the second signal indicate a substantial increase of garbage area over a nominal value for the area, the above option in the operation scheme could be a more efficient if the control block 303 is able to select two or more cleaning robots capable of being dispatched respectively to the two or more regions for performing corresponding cleaning tasks with shorter operation time and less battery power usage overall.

Figure 3:
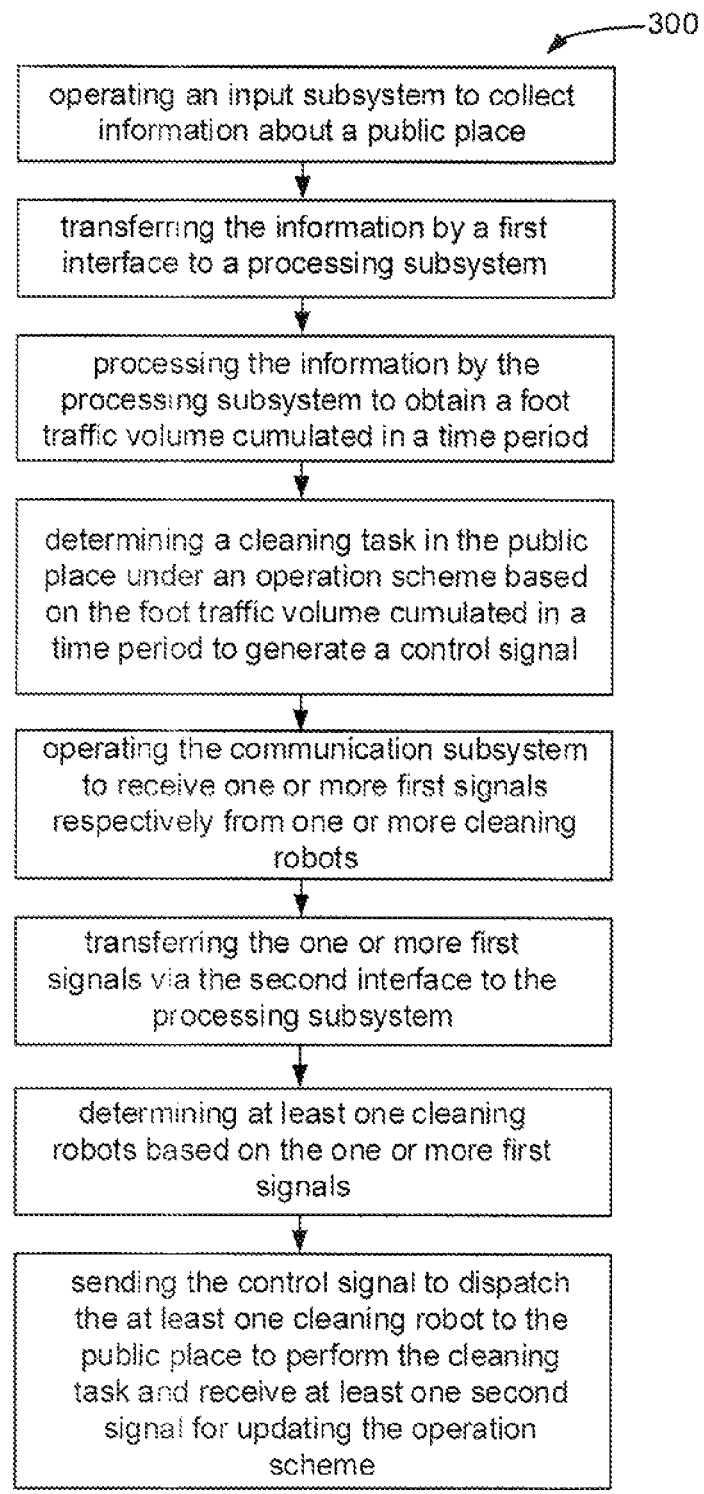
FIG. 3 is flow chart showing a method of operating a system for dispatching a cleaning robot under an operation scheme for performing cleaning task according to some embodiments of the present disclosure.

FIG. 3 is flow chart showing a method of operating a system for dispatching a cleaning robot under an operation scheme for performing cleaning task according to some embodiments of the present disclosure. Referring to FIG. 3, the method 300 is an intelligent dispatching method based on operation of the system 100 described earlier together with multiple cleaning robots 200 for maintaining cleanliness of multiple areas (e.g., multiple public places). The method 300 includes operating an input subsystem of the system 100 to collect information about an area. Particularly, the information includes a cumulated foot-traffic volume in a cumulated time period for the area counted from finishing time of a last cleaning task of the area. The input subsystem includes monitoring devices such as camera, counter, video recorder, and so on which are readily available for most public places in developed urban area.

Referring to FIG. 3, the method 300 further includes transferring the information about the cumulated foot-traffic volume in the cumulated time period by a first interface to a processing subsystem of the system 100. This information transfer is performed automatically through the setup of the input subsystem itself. The first interface serves a communication channel for passing the information in terms of digital data. Optionally, the information is a plurality of image data. Optionally, the information includes digital data about number of people and time duration of those people passing a certain area or staying or conducting certain activities in the area. Optionally, the digital form of this information is constantly stored and archived in a memory of the processing subsystem.

Referring to FIG. 3, the method 300 additionally includes processing the information by the processing subsystem to obtain at least a cumulated foot-traffic volume in a time period starting from an end of a last cleaning task in the subject area. The processing subsystem is able to process a plurality of image data to deduce a pair of quantitative values referring to a cumulated foot-traffic volume associated with the area and a time period for collecting the foot-traffic volume. Although other quantitative information can be deduced from the plurality of image data in association with information about dirtiness level in the area, the cumulated foot-traffic volume collected in the time period are used as an input for the processing subsystem to execute an operation scheme for determining if a cleaning task is necessary for the area.

Referring to FIG. 3 again, the method 300 includes determining a cleaning task in the area under an operation scheme based on the cumulated foot traffic volume in the time period to generate a control signal. The operation scheme is defined by multiple parameters designed for setting up a cleaning plan based on empirical data about the dirtiness level, typical foot-traffic volume and variation in daily basis for the area. In particular, a control block in the processing subsystem is using the cumulated foot traffic volume in the time period as an input of a logic calculation for comparing them with relevant threshold parameters assigned for a current version of the operation scheme. For example, if the cumulated foot traffic volume in the time period is greater than a foot-traffic threshold and the time period is longer than a duration threshold, a cleaning task in determined to be initiated for the area. Accordingly, a control signal is generated for providing instruction for moving the cleaning robot toward a field position and guiding it to start performing the cleaning task from there in the area. Optionally, the cumulated foot traffic volume in the time period is used as an input to determine which volume range and which time range of those two quantitative values fall into. Then a value of probability-for-cleaning assigned for those ranges based on a predetermined correspondence relationship between various foot-traffic volumes and given probability values ranging from 0 to 1 is reassigned as a current value of probability-for-cleaning for the area. The current value of probability-for-cleaning is then compared with a probability threshold that is a predefined value, e.g., 50%, for initiating a cleaning task. The logic conclusion of the comparison leads to a determination of a cleaning task and generate a control signal accordingly, when the current value of probability-for-cleaning is found larger than or equal to the probability threshold. Of course, if the current value of probability-for-cleaning is found smaller than the probability threshold, then it is determined no cleaning task is needed.

Referring to FIG. 3, the method 300 also includes operating the communication subsystem to receive one or more first signals respectively from one or more cleaning robots, transferring the one or more first signals via the second interface to the processing subsystem, and determining at least one cleaning robots based on the one or more first signals. In an embodiment, the processing system needs to select one or more cleaning robots that are most suitable for performing the cleaning task before sending the control signal to them. One or more first signals from the cleaning robots carry the information about current modes, available battery powers, and travel times for the cleaning robots to move towards the field position associated with the cleaning task, which are basis for the system 100 to select or determine which one or more cleaning robots are the most suitable candidates for the upcoming cleaning task. Optionally, the communication subsystem of the system 100 includes a transceiver configured to receive one or more first signals via a wireless network from the one or more cleaning robots in the field. Optionally, the transceiver is also configured to transmit the one or more first signals through a bi-directional bus of the second interface to the processing subsystem. The processing subsystem further will process the one or more first signals through multiple logic calculation to select at least one cleaning robot for the cleaning task based on working mode, battery power, and shortest time to travel, etc. out of the one or more cleaning robots in the field.

Referring further to FIG. 3, the method 300 includes sending the control signal to dispatch the at least one cleaning robot to the area to perform the cleaning task and receive at least one second signal for updating the operation scheme. After the selection of the at least one cleaning robot as the most suitable one for the cleaning task in the area, the control signal is sent from the communication subsystem via the wireless network to the selected cleaning robot. The control signal, after being received by a communication unit of the cleaning robot, then is converted to specific instructions by a control unit of the cleaning robot to drive its moving unit in operation to move the cleaning robot to the field position and to guide its cleaning unit to perform relevant cleaning in garbage area.

Figure 4:
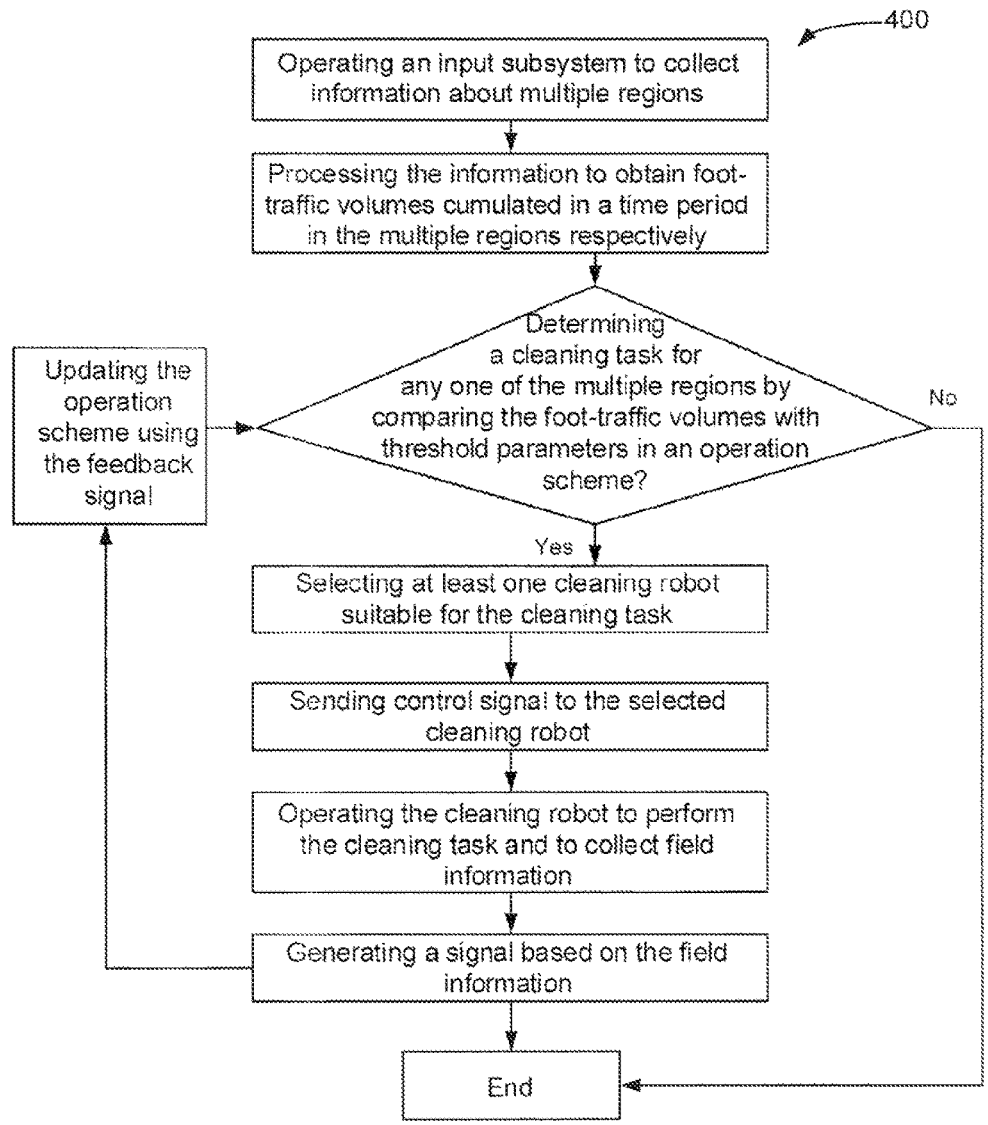
FIG. 4 is a flow chart showing part of the operation scheme according to some embodiments of the present disclosure.

FIG. 4 is a flow chart showing part of the operation scheme according to some embodiments of the present disclosure. Referring to FIG. 4, an example of an operation flow 400 for determining a cleaning task and dispatching a cleaning robot based on a self-learning operation scheme is illustrated. As shown, the operation flow 400 starts with operating an input subsystem to collect information about multiple regions. The information about multiple regions is intended to be used as input for an intelligent determination under the operation scheme whether a cleaning task is needed for the multiple regions. In general, human activity in terms of foot-traffic volume would be a good indicator about dirtiness in each region. Particularly, the information could be provided in terms of images cumulated over time for each region. Next, the flow 400 continues with processing the information to obtain foot-traffic volumes cumulated in a time period in the multiple regions respectively. In this step, the specific value of foot-traffic volumes cumulated in the time period respectively for the multiple regions are deduced through digital image processing and calculations and can be loaded as inputs of the operation scheme.

In some embodiments, the operation scheme includes multiple logic functions, such as determining, selecting, communicating, dividing or updating, supported by multiple parameters. Each function is executable by a logic control block as certain input information is provided and one or more outputs including a control signal can be generated accordingly. Referring to FIG. 4, the operation flow 400 is performing a determining function to decide whether a cleaning task is needed for any one of the multiple regions by comparing input information of the foot-traffic volumes cumulated in the time period with corresponding threshold parameters preset for current operation scheme. If a logic output of this determining function is "No", the operation flow is ended. If a logic output of the determining function is "Yes", the operation flow continues to next step.

Under the operation scheme, assuming that the input information meets certain criteria defined by the threshold parameters, the output yields "Yes". Particularly for this case, at least one of the multiple regions is determined to need a cleaning task there. According a control signal for the cleaning task is generated.

The operation flow 400 further is performing a selecting function under the operation scheme to select at least one cleaning robot suitable for the cleaning task just initiated. Again, certain input information is required for this selecting function. Particularly, the input information may come from multiple cleaning robots in the multiple regions regarding their current working modes, locations, battery life, etc. Partially, the communicating function of the operation scheme is also involved as the input information needs to be sent as a first signal to the control block from multiple cleaning robots respectively. Under the operation scheme, the information for all cleaning robots is analyzed and at least one cleaning robot may be selected assuming it is the best in meeting various criteria defined by multiple parameters for the cleaning task in the determined one of the multiple regions.

Once the selecting function is successfully accomplished, the operation flow 400 is performing a communicating function to send the control signal to the at least one cleaning robot selected for the cleaning task. As seen in FIG. 1 and FIG. 2, the communicating function may be executed through the communication subsystem via the second interface with the control block and via wireless network with a communication unit of the cleaning robot.

The operation flow 400 further includes a step of operating the cleaning robot to perform the cleaning task and to collect field information. This step partly involves the communicating function as the cleaning robot uses the control signal to drive its moving unit and cleaning unit for performing the cleaning task in the determined one region. Further the operation flow 400 is to perform the communicating function of the operation scheme to generating a signal by the cleaning robot based on the field information sent back to the control block. The field information is about a dirtiness level of the region currently being cleaned and sent as a second signal back to the control block.

The operation flow 400 then includes a loop to perform an updating function of the operation scheme based on the second signal. Particularly, the control block is configured to update one or more parameters used to define the operation scheme based on the second signal as an input received from the cleaning robot that finishes a latest cleaning task in a latest determined one of multiple regions. The output of the updating function is to provide a new version of the operation scheme which is ready for being employed by the system to dispatch one or more cleaning robots for maintaining cleanliness of multiple regions in more accurate and more efficient way.

Figure 5:
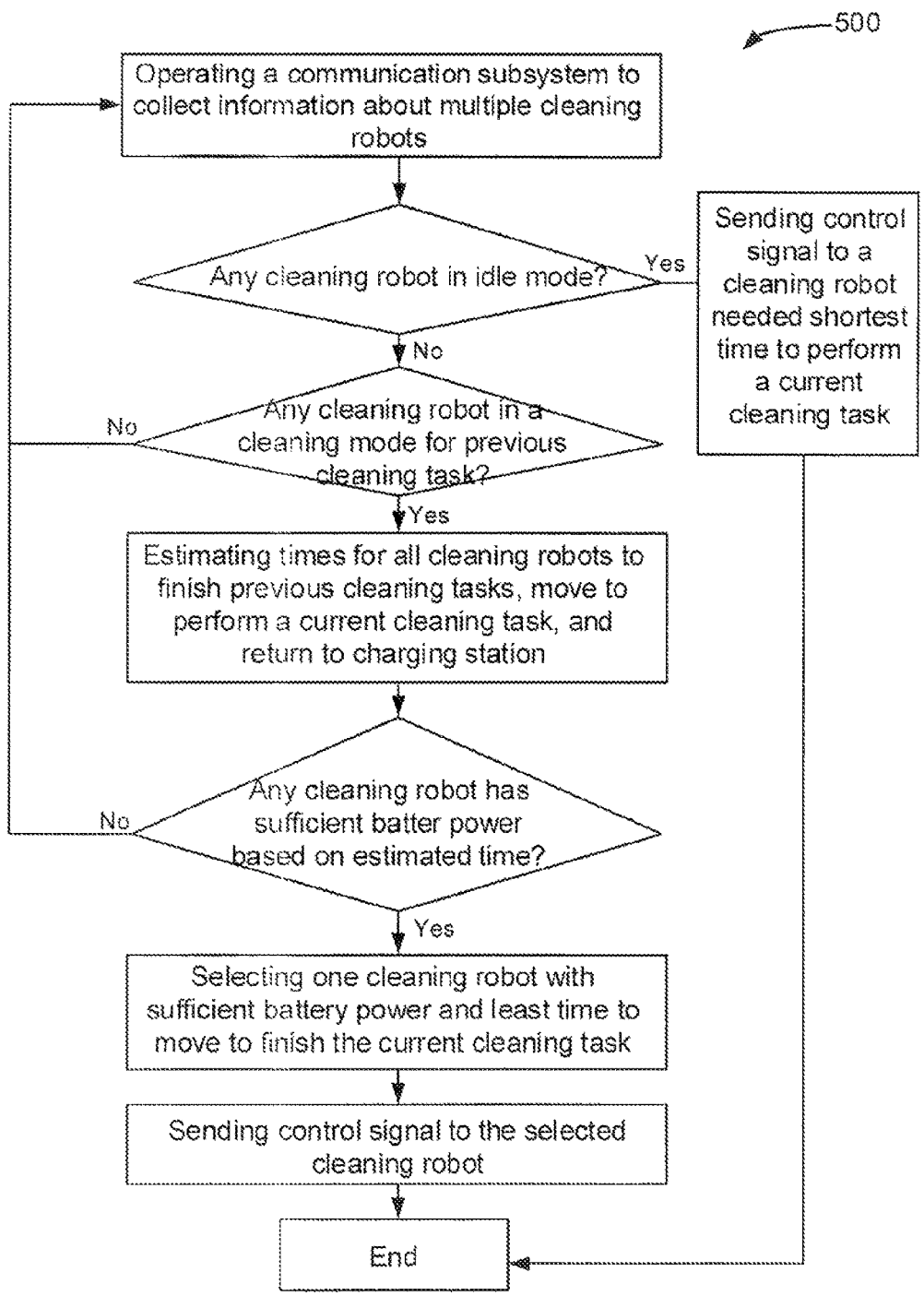
FIG. 5 is a flow chart showing part of the operation scheme according to some embodiments of the present disclosure.

FIG. 5 is a flow chart showing part of the operation scheme according to some embodiments of the present disclosure. This flow provides more details about a selecting function of the operation scheme employed by a system for intelligently dispatching cleaning robot for performing a just-initiated cleaning task in an area (e.g., a public place) disclosed throughout the specification. Referring to FIG. 5, the flow 500 starts with a step of operating a communication subsystem of the system to collect information about multiple cleaning robots provided in the area. This information includes working modes, locations, battery life, mechanical conditions, etc. and should be updated substantially in real time whenever any above information is changed and passed as a signal sent to a control block of the system. The feedback signal will be used as an input for the control block to execute the selecting function.

Referring to FIG. 5, the flow 500 then is to perform a step of the selecting function on determining whether any cleaning robot is in idle mode. Directly based on the feedback signal, one or more cleaning robots in idle mode can be determined. The idle mode means that the cleaning robot is fully charged in station and ready to take any cleaning task. Optionally, it may include cleaning robot in moving mode with sufficient battery life but ready to take a cleaning task. Assuming that the output of this sub-step is "Yes", a selection logic operation is performed by the control block to select one cleaning robot out of the one or more cleaning robots that needs the shortest time to finish the just-initiated cleaning task. Then the selecting function is finished.

Alternatively, assuming that the output of the above step of the selecting function is "No", meaning none of cleaning robots is in idle mode. The operation flow 500 then moves to next step of determining whether any cleaning robot is in cleaning mode which means it is currently performing a previously-assigned cleaning task. A cleaning robot in cleaning mode is able to accept new cleaning task. If the output of this step is "No", meaning none of cleaning robots is in cleaning mode (e.g., every cleaning robot in charging mode, so no cleaning task is taken for now until the charging to any one is finished), then the flow 500 loops back to continue the starting step to evaluate the information from all cleaning robots or wait for a mode change event of any cleaning robot.

Alternatively, if the output of above step is "Yes", meaning that one or more cleaning robots are in cleaning mode, then the flow 500 further is to perform a step of estimating times for the one or more cleaning robots in cleaning mode to finish respective previously-assigned cleaning tasks plus to move to perform a current cleaning task, and optionally plus to return to a charging station. The selection logic operation under the operation scheme is to identify a best cleaning robot in cleaning mode that can take least time to accomplish overall tasks. Of course, many other detail considerations can be included in the operation scheme for executing this selecting function.

Further, referring to FIG. 5, the flow 500 is to perform a step of determining whether any cleaning robot has sufficient batter power based on estimated time to accomplish overall tasks including the previously-assigned task, moving, and the just-initiated cleaning task. Assuming the output of this step is "No", then the just-initiated cleaning task cannot be accomplished and the operation flow 500 loops back to continue the starting step to evaluate the information from all cleaning robots or wait for a mode change event of any cleaning robot.

Assuming the output of the above step is "Yes", then the flow 500 moves to perform a step of selecting one cleaning robot with sufficient battery power and least time to move to the field position to perform and finish the just-initiated cleaning task. The flow 500 executes a last step for the control block to send the control signal to the selected one cleaning robot for performing the cleaning task.

Figure 6:
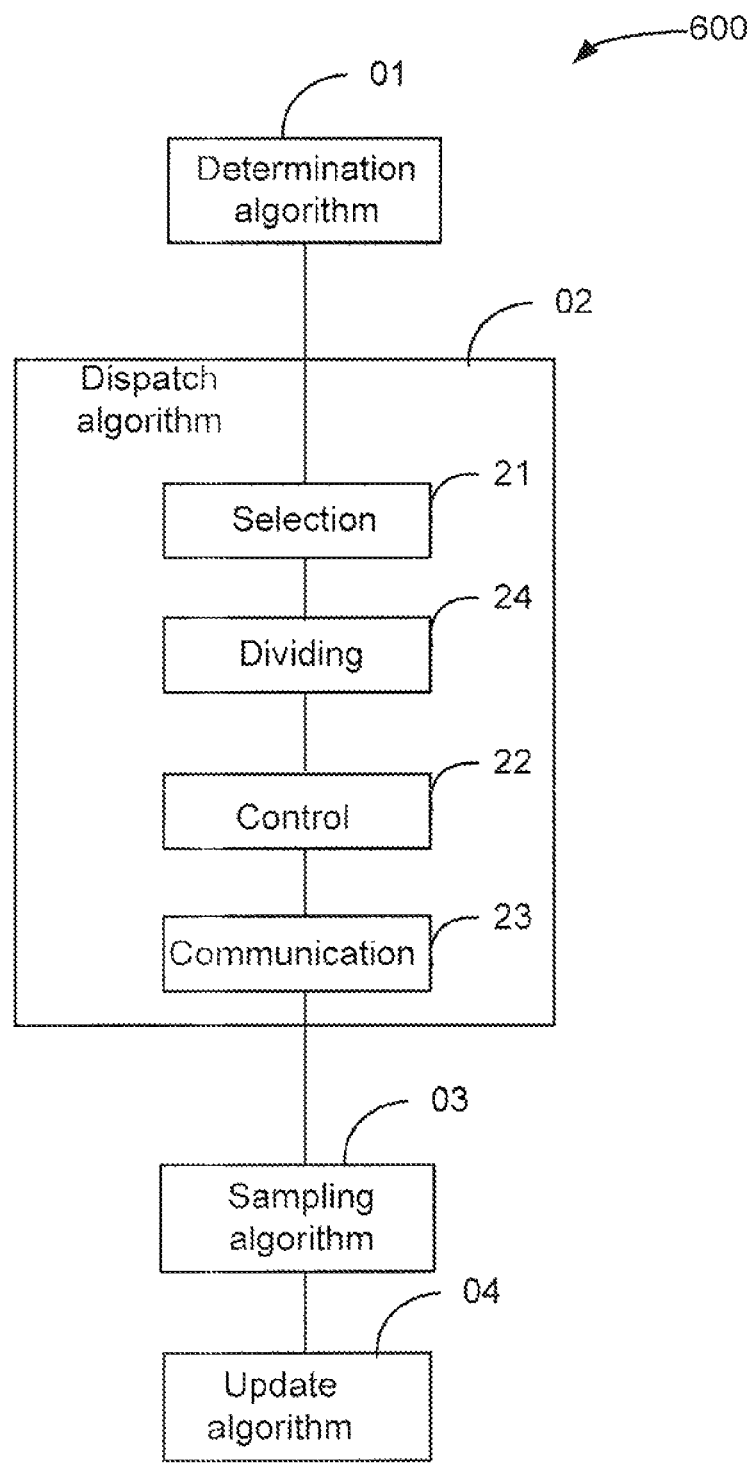
FIG. 6 is a block diagram showing functions of the operation scheme according to some embodiments of the present disclosure.

FIG. 6 is a block diagram showing functions of the operation scheme according to some embodiments of the present disclosure. Referring to FIG. 6, operation scheme 600 includes various functional algorithms containing a plurality of computer-executable instructions stored in the memory 301 of the system 100 (FIG. 1) and executable by the control block 303. In an embodiment, the operation scheme 600 is substantially the same one described in FIG. 3, FIG. 4, and FIG. 5, integrated with the system 100 (FIG. 1) for intelligently determining an area (e.g., a public place) that needs a cleaning task and dispatching at least one cleaning robot for performing the cleaning task. In an embodiment, the operation scheme 600 includes a determination algorithm 01 for determining an area that needs a cleaning task based on a piece of input information of a cumulated foot-traffic volume in a time period. Optionally, the determination algorithm 01 includes a first plurality of computer-executable instructions to be executed by the control block for determining a cleaning task needed for an area based on a determination that the cumulated foot-traffic volume for the area is greater than or equal to a preset foot-traffic threshold and the time period associated with the cumulated foot-traffic volume is greater than or equal to a preset duration threshold.

Optionally, the determination algorithm 01 includes a second plurality of computer-executable instructions to be executed by the control block for determining the cleaning task base on a determination that the cumulated foot-traffic volume is smaller than the second foot-traffic threshold but greater than the first foot-traffic threshold and the time period is shorter than the second duration threshold but longer than the first duration threshold, that the cumulated foot-traffic volume is in one of the multiple volume ranges and the time period is in one of multiple time ranges, and that the probability-for-cleaning corresponding to the one of the multiple volume ranges and the one of the multiple time ranges is greater than or equal to the probability threshold.

In another embodiment, the operation scheme 600 includes a dispatch algorithm 02 for intelligently dispatching a cleaning robot to perform the cleaning task assigned for a particular area. Optionally, the dispatch algorithm 02 includes selecting one or more cleaning robots, dividing the area associated with the cleaning task optionally into two or more regions, and formatting one or more control signals respectively to be sent to the selected one or more cleaning robots for performing the cleaning task in the area and optionally to two or more cleaning robots respectively for cleaning in the two or more regions.

Optionally, the dispatch algorithm 02 includes a selection function 21 with a third plurality of computer-executable instructions to be executed by the control block for selecting one cleaning robot capable of moving to a field position in a shortest time for performing the cleaning task as a selected cleaning robot out of the one or more cleaning robots determined to be at idle modes having full strength of battery power based on the one or more first signals.

Optionally, the dispatch algorithm 02 includes another selection function 21 with a fourth plurality of computer-executable instructions to be executed by the control block for selecting one cleaning robot with a most available battery power sufficient for capable of finishing a previous cleaning task and moving to the field position to perform the cleaning task in a shortest time as a selected cleaning robot out of the one or more cleaning robots determined to be at cleaning modes based on the one or more first signals.

Optionally, the dispatch algorithm 02 includes a dividing function 24 with a fifth plurality of computer-executable instructions to be executed by the control block for dividing an cleaning area associated with the cleaning task into two or more sub-areas associated with two or more second cleaning tasks based on the at least one second signal after selecting two or more cleaning robots capable of performing the cleaning task out of the one or more cleaning robots at idle modes based on the one or more first signals, and sending two or more second control signals via the communication subsystem respectively to the two or more cleaning robots to move them respectively to the two or more sub-areas to respectively perform the two or more second cleaning tasks.

Optionally, the dispatch algorithm 02 includes a control function 22 for generating a control signal for each initiated cleaning task and a communication function 23 for transferring the control signal to the selected cleaning robot for guiding it to perform the just-initiated cleaning task. The control function 22 is executed by the control block of the system 100. The communication function 23 is also executed by the control block as well as the second interface and communication subsystem of the system 100 (see FIG. 1).

In another embodiment, the operation scheme 600 includes a sampling algorithm 03 with a sixth plurality of computer-executable instructions to be executed by a selected cleaning robot that is performing the cleaning task to operate an inspection device to measure garbage area or quantity associated with the cleaning task to determine a dirtiness level to be sent as one of the second signal back to the control block via the communication subsystem and further executed by the processing block for comparing the dirtiness level with the dirtiness threshold level. This sampling algorithm 03 may also be executed by control block of the system 100 based on input signal provided from the input subsystem as the input signal firstly is used as an input for the update algorithm 04 (mentioned below).

In another embodiment, the operation scheme 600 includes an update algorithm 04 with a seventh plurality of computer-executable instructions to be executed by the control block for updating the value of the probability-for-cleaning corresponding to the cumulated foot-traffic volume in one of the multiple volume ranges and the time period within one of the multiple time ranges by increasing a first preset amount if the dirtiness level is determined to be greater than the dirtiness threshold level, or by decreasing a second preset amount if the dirtiness level is determined to be smaller than the dirtiness threshold level. The first preset amount and the second preset amount being obtained empirically and varied for different environment of different areas (e.g., different public places). This update algorithm 04 optionally takes input signal from the input subsystem as an input for performing update function. This algorithm can be expanded to include updating of multiple other parameters used to define the operation scheme. The updated amount of some parameters can be obtained automatically based on a higher-level scheme.

The foregoing description of the embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present disclosure" or the like does not necessarily limit the claim scope to a specific embodiment, and the reference to exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. Any advantages and benefits described may not apply to all embodiments of the invention. It should be appreciated that variations may be made in the embodiments described by persons skilled in the art without departing from the scope of the present disclosure as defined by the following claims. Moreover, no element and component in the present disclosure is intended to be dedicated to the public regardless of whether the element or component is explicitly recited in the following claims.

What is claimed is:

1. A system for dispatching cleaning robots, comprising:
   an input subsystem configured to provide an input signal including information about foot traffic in a time period in an area;
   a processing subsystem comprising a processing block and a control block, the processing block configured to receive the input signal and process the input signal to obtain a foot traffic volume cumulated in the time period, the control block coupled to the processing block to determine a cleaning task in the area based on a result of the foot traffic volume cumulated in the time period under an operation scheme and generate a control signal for the cleaning task; and
   a communication subsystem configured to receive the control signal from the processing subsystem and one or more first signals respectively from the one or more cleaning robots indicating operating status of the one or more cleaning robots, configured to send the control signal based on the one or more first signals to dispatch at least one cleaning robot to the area to perform the cleaning task, and configured to receive at least one second signal from the at least one cleaning robot for the processing block to update the operation scheme; the at least one second signal indicating a progress of the cleaning task being performed.

2. The system of claim 1, wherein the input subsystem comprises a plurality of monitoring devices including surveillance cameras and traffic counters being disposed in multiple areas.

3. The system of claim 2, wherein the input signal comprises a plurality of images collected by one or more surveillance cameras in the area over the time period counted from a time when a cleaning task is finished in the area by one cleaning robot.

4. The system of claim 3, wherein the processing block is configured to process the plurality of images to obtain a cumulated foot-traffic volume in the time period for the area.

5. The system of claim 4, wherein the processing subsystem further comprises a memory coupled to the processing block, the memory configured to store the input signal and multiple parameters used to define the operation scheme, the multiple parameters including a first foot-traffic threshold, a second foot-traffic threshold, multiple volume ranges between the first foot-traffic threshold and the second foot-traffic threshold, a first duration threshold, a second duration threshold, multiple time ranges between the first duration threshold and the second duration threshold, multiple values of probability-for-cleaning assigned respectively to the multiple volume ranges and multiple time ranges, a probability threshold for initiating a cleaning task, and a dirtiness threshold level preset for a standard cleaning task.

6. The system of claim 5, wherein the operation scheme comprises computer-executable instructions to be executed by the control block for determining that the cleaning task is needed based on a determination that the cumulated foot-traffic volume is greater than or equal to the second foot-traffic threshold and the time period is greater than or equal to the second duration threshold.

7. The system of claim 6, wherein the operation scheme further comprises computer-executable instructions to be executed by the control block for determining the cleaning task base on a determination that the cumulated foot-traffic volume is smaller than the second foot-traffic threshold but greater than the first foot-traffic threshold and the time period is shorter than the second duration threshold but longer than the first duration threshold, that the cumulated foot-traffic volume is in one of the multiple volume ranges and the time period is in one of multiple time ranges, and that the probability-for-cleaning corresponding to the one of the multiple volume ranges and the one of the multiple time ranges is greater than or equal to the probability threshold.

8. The system of claim 5, wherein the operation scheme comprises computer-executable instructions for selecting one or more cleaning robots, dividing the area associated with the cleaning task optionally into two or more regions, and formatting one or more control signals respectively to be sent to the selected one or more cleaning robots for performing the cleaning task in the area and optionally to two or more cleaning robots respectively for cleaning in the two or more regions.

9. The system of claim 8, wherein the operation scheme further comprises computer-executable instructions to be executed by the control block for selecting one cleaning robot capable of moving to a field position in a shortest time for performing the cleaning task as a selected cleaning robot out of the one or more cleaning robots determined to be at idle modes having full strength of battery power based on the one or more first signals.

10. The system of claim 8, wherein the operation scheme further comprises computer-executable instructions to be executed by the control block for selecting one cleaning robot with a most available battery power sufficient for capable of finishing a previous cleaning task and moving to the field position to perform the cleaning task in a shortest time as a selected cleaning robot out of the one or more cleaning robots determined to be at cleaning modes based on the one or more first signals.

11. The system of claim 8, wherein the operation scheme further comprises computer-executable instructions to be executed by the control block for dividing an cleaning area associated with the cleaning task into two or more sub-areas associated with two or more second cleaning tasks based on the at least one second signal after selecting two or more cleaning robots capable of performing the cleaning task out of the one or more cleaning robots at idle modes based on the one or more first signals, and sending two or more second control signals via the communication subsystem respectively to the two or more cleaning robots to move them respectively to the two or more sub-areas to respectively perform the two or more second cleaning tasks.

12. The system of claim 5, wherein the operation scheme comprises a sampling algorithm including a sixth plurality of computer-executable instructions to be executed by a selected cleaning robot that is performing the cleaning task to operate an inspection device to measure garbage area or quantity associated with the cleaning task to determine a dirtiness level to be sent as one of the second signal back to the control block via the communication subsystem and further executed by the processing block for comparing the dirtiness level with the dirtiness threshold level.

13. The system of claim 12, wherein the operation scheme comprises an update algorithm including a seventh plurality of computer-executable instructions to be executed by the control block for updating the value of the probability-for-cleaning corresponding to the cumulated foot-traffic volume in one of the multiple volume ranges and the time period within one of the multiple time ranges by increasing a first preset amount if the dirtiness level is determined to be greater than the dirtiness threshold level, or by decreasing a second preset amount if the dirtiness level is determined to be smaller than the dirtiness threshold level, the first preset amount and the second preset amount being obtained empirically.

14. The system of claim 1, wherein the communication subsystem comprises a transceiver capable of transmitting control signals to and receiving feedback signals from the one or more cleaning robots via a wireless network and capable of exchanging the control signals and the feedback signals with the control block.

15. A method for operating a system for dispatching one or more cleaning robots to perform a cleaning task, the system comprising an input subsystem, a processing subsystem coupled to the input subsystem, a communication subsystem coupled to the processing subsystem, the method comprising:
 collecting information about foot traffic in a time period for an area by the input subsystem;
 processing the information by the processing subsystem to obtain a foot traffic volume cumulated in the time period;
 determining a cleaning task in the area based on a result of the foot traffic volume cumulated in the time period by the processing subsystem under an operation scheme defined by multiple parameters to generate a control signal for the cleaning task;
 receiving one or more first signals indicating operating status of the one or more cleaning robots respectively from one or more cleaning robots by the communication subsystem;
 determining at least one of the one or more cleaning robots most suitable for the cleaning task by the processing subsystem, based on the one or more first signals;
 sending the control signal to dispatch the at least one cleaning robot to the area to perform the cleaning task; and
 receiving at least one second signal for adjusting at least one of the multiple parameters to update the operation scheme, the at least one second signal indicating a progress of the cleaning task being performed.

16. The method of claim 15, wherein collecting information about foot traffic comprises taking a plurality of images in the time period of multiple time windows with at least one image per time window by at least one public surveillance camera in the area.

17. The method of claim 16, wherein processing the information comprises processing the plurality of images by counting people in the at least one image per time window to deduce a foot-traffic volume thereof and obtain a cumulated foot-traffic volume in entire duration of the time period.

18. The method of claim 15, wherein determining the cleaning task comprises determining the cumulated foot-traffic volume to be greater than or equal to a first foot-traffic threshold and determining the time period to be longer than or equal to a first duration threshold, the first foot-traffic threshold and the first duration threshold being two parameters of the multiple parameters for defining a part of the operation scheme.

19. The method of claim 18, wherein determining the cleaning task further comprises determining a cleaning probability by the processing subsystem to be greater than or equal to a probability threshold after determining the cumulated foot-traffic volume to be greater than the first foot-traffic threshold but smaller than a second foot-traffic threshold and the time period to be longer than the first duration threshold but shorter than a second duration threshold, the second foot-traffic threshold and the second duration threshold and the probability threshold being three parameters for defining another part of the operation scheme.

20. The method of claim 19, wherein determining the cleaning probability by the processing subsystem further comprises defining multiple time ranges between the first duration threshold and the second duration threshold, defining multiple volume ranges between the first foot-traffic threshold and the second foot-traffic threshold, assigning multiple values of the cleaning probability increasing from 0 to 1 respectively corresponding to the multiple volume ranges increasing from the first foot-traffic threshold to the second foot-traffic threshold for each of the multiple time ranges, and determining a current value of the cleaning probability—by determining the cumulated foot-traffic volume to be in a corresponding one of the multiple volume ranges with the time period to be in a corresponding one of the multiple time ranges, comparing the current value with the probability threshold, the multiple values of the cleaning probability being parameters for defining yet another part of the operation scheme.

* * * * *